(12) United States Patent
Coomans et al.

(10) Patent No.: US 10,200,167 B2
(45) Date of Patent: Feb. 5, 2019

(54) FULL-DUPLEX COMMUNICATION OVER A SHARED TRANSMISSION MEDIUM

(71) Applicant: Alcatel Lucent, Boulogne-Billancourt (FR)

(72) Inventors: Werner Coomans, Antwerp (BE); Hungkei Chow, Murray Hill, NJ (US); Jochen Maes, Antwerp (BE)

(73) Assignee: Alcatel Lucent, Boulogne Billancourt (FR)

( * ) Notice: Subject to any disclaimer, the term of this patent is extended or adjusted under 35 U.S.C. 154(b) by 37 days.

(21) Appl. No.: 15/301,527

(22) PCT Filed: Apr. 21, 2015

(86) PCT No.: PCT/EP2015/058541
§ 371 (c)(1),
(2) Date: Oct. 3, 2016

(87) PCT Pub. No.: WO2015/162104
PCT Pub. Date: Oct. 29, 2015

(65) Prior Publication Data
US 2017/0222775 A1    Aug. 3, 2017

(30) Foreign Application Priority Data

Apr. 25, 2014 (EP) .................................... 14305610

(51) Int. Cl.
*H04L 5/00* (2006.01)
*H04B 3/32* (2006.01)
(Continued)

(52) U.S. Cl.
CPC ............. *H04L 5/0037* (2013.01); *H04B 3/32* (2013.01); *H04B 17/309* (2015.01);
(Continued)

(58) Field of Classification Search
None
See application file for complete search history.

(56) References Cited

U.S. PATENT DOCUMENTS

| 2003/0086514 A1 | 5/2003 | Ginis et al. |
| 2007/0081582 A1 | 4/2007 | Ginis et al. |

(Continued)

FOREIGN PATENT DOCUMENTS

| CN | 103636152 A | 3/2014 |
| EP | 2136477 A1 | 12/2009 |

(Continued)

OTHER PUBLICATIONS

International Search Report PCT/ISA/210 for International Application No. PCT/EP2015/058541 dated Jun. 15, 2015.
(Continued)

*Primary Examiner* — Otis L Thompson, Jr.
(74) *Attorney, Agent, or Firm* — Harness, Dickey & Pierce, P.L.C.

(57) ABSTRACT

The present invention relates to a method for assigning transmission resources (101) to communications between an access node (11) and a plurality of subscriber devices (41 to 46) coupled to a shared transmission medium.
In accordance with an embodiment of the invention, the method comprises characterizing interference between respective ones of the plurality of subscriber devices over the shared transmission medium, grouping highly-interfering subscriber devices into respective interfering groups (G1, G2, G3, G4) based on the so-characterized interference, and assigning disjoint transmission time intervals to upstream communication from any one subscriber device of any one interfering group and to downstream communication towards any other subscriber device of the same interfering group.

(Continued)

The present invention also relates to a resource controller.

10 Claims, 3 Drawing Sheets

(51) Int. Cl.
  *H04J 11/00* (2006.01)
  *H04L 27/26* (2006.01)
  *H04Q 11/04* (2006.01)
  *H04B 17/309* (2015.01)
  *H04B 17/318* (2015.01)
  *H04B 17/345* (2015.01)
  *H04L 5/14* (2006.01)

(52) U.S. Cl.
  CPC ......... *H04B 17/318* (2015.01); *H04B 17/345* (2015.01); *H04J 11/0026* (2013.01); *H04J 11/0043* (2013.01); *H04L 5/14* (2013.01); *H04L 27/2691* (2013.01); *H04Q 11/04* (2013.01); *H04L 5/0005* (2013.01); *H04Q 2213/19* (2013.01); *H04Q 2213/292* (2013.01)

(56) References Cited

U.S. PATENT DOCUMENTS

| | | | |
|---|---|---|---|
| 2009/0310502 A1 | 12/2009 | Nuzman et al. | |
| 2012/0063531 A1 | 3/2012 | Ginis et al. | |
| 2012/0236731 A1* | 9/2012 | Beaudin | H04W 72/082 370/248 |
| 2012/0250526 A1* | 10/2012 | Zhao | H04B 7/2606 370/243 |
| 2012/0257691 A1 | 10/2012 | Ginis et al. | |
| 2013/0155912 A1* | 6/2013 | Khojastepour | H04W 72/0413 370/277 |
| 2013/0242806 A1* | 9/2013 | Nagata | H04W 72/0446 370/256 |
| 2014/0029506 A1 | 1/2014 | Sahin et al. | |
| 2014/0086093 A1* | 3/2014 | Liu | H04J 13/10 370/252 |
| 2014/0169234 A1* | 6/2014 | Zhu | H04W 72/082 370/277 |
| 2014/0254704 A1 | 9/2014 | Ginis et al. | |
| 2014/0294385 A1 | 10/2014 | Khotimsky et al. | |
| 2015/0085805 A1* | 3/2015 | Li | H04W 72/121 370/329 |
| 2017/0019242 A1* | 1/2017 | Jin | H04L 5/1461 |
| 2017/0071004 A1 | 3/2017 | Noh et al. | |
| 2017/0093555 A1* | 3/2017 | Hamzeh | H04L 5/1469 |
| 2017/0265092 A1* | 9/2017 | Liu | H04J 13/10 |
| 2017/0373820 A1* | 12/2017 | Hamzeh | H04L 5/1469 |

FOREIGN PATENT DOCUMENTS

| | | |
|---|---|---|
| EP | 3 125 632 A | 2/2017 |
| JP | 2017514339 A | 6/2017 |
| WO | WO-02100008 A1 | 12/2002 |
| WO | WO-2012075031 A2 | 6/2012 |
| WO | WO-2012139516 A1 | 10/2012 |
| WO | WO-2015/147569 A | 10/2015 |

OTHER PUBLICATIONS

Written Opinion of the International Searching Authority PCT/ISA/237 for International Application No. PCT/EP2015/058541 dated Jun. 15, 2015.

* cited by examiner

FULL-DUPLEX COMMUNICATION OVER A SHARED TRANSMISSION MEDIUM

TECHNICAL FIELD OF THE INVENTION

The present invention relates to full-duplex communication over a shared transmission medium. Technical Background of the Invention The DSL paradigm, inc. orthogonal Frequency Division Multiplexing (OFDM) and Discrete multi-Tone (DMT) techniques, which has proven to be particularly successful for achieving very high data rates over bandwidth-limited copper plants, is now considered for higher-quality transmission media, such as coaxial cables.

A coaxial cable plant is a shared Point to Multi-Point (PtMP) medium connecting a central node to a plurality of terminals via coaxial segments coupled to each other by means of taps, power splitters/combiners, couplers and the likes.

Full-duplex communication is envisioned as a way to make the most optimal use of the cable plant. Terminals are still assigned non-overlapping frequency bands, yet the same set of carriers can be used for both downstream and upstream communications, yielding a doubling of the data throughput compared to half-duplex or Frequency Division Duplexing (FDD) technique. Some technical hurdles yet are to be overcome.

For instance, self-interference from the transmit path into the receive path within one and the same transceiver (referred to as echo hereinafter) shall be properly canceled.

This is possible because both the transmit signal and the loop-back coupling function are known to the transceiver. Echo cancellation can be implemented by means of hybrid circuits and/or by means of signal post-processing techniques, such as Least Mean square (LMS) filters, etc.

Also, the upstream transmit signal from one terminal leaks into the downstream path of another terminal if the terminals have limited isolation. For example, in a typical cable network, the tap-to-tap isolation is only 20-25 dB. Unlike the self-interference signal, this inter-terminal interference cannot be removed because the transmit signal is not known to the receiving terminal. This interfering signal will add power to the direct receive signal from the FCU as the two signals are uncorrelated, and thus can cause signal clipping in the transceiver and make the direct receive signal undetectable. Indeed, the analog part of a transceiver is designed for a given and fixed frequency band, no matter if only a subset thereof is actually assigned for communication.

To mitigate the inter-terminal interference at the receiver, a straightforward approach would be to increase the dynamic range of all receivers such that they would not be clipped due to this undesired high-power interference signal. This approach, however, would decrease the signal resolution for the lower-power useful signal, and hence penalizes the downstream link performance.

SUMMARY OF THE INVENTION

It is an object of the present invention to overcome the aforementioned deficiencies and drawbacks of the prior art solutions, and to improve full-duplex communication over a shared transmission medium.

In accordance with a first aspect of the invention, a method for assigning transmission resources to communications between an access node and a plurality of subscriber devices coupled to a shared transmission medium comprises characterizing interference between respective ones of the plurality of subscriber devices over the shared transmission medium, grouping highly-interfering subscriber devices into respective interfering groups based on the so-characterized interference, and assigning disjoint transmission time intervals to upstream communication from any one subscriber device of any one interfering group and to downstream communication towards any other subscriber device of the same interfering group.

In accordance with a further aspect of the invention, a resource controller for assigning transmission resources to communications between an access node and a plurality of subscriber devices coupled to a shared transmission medium is configured to characterize interference between respective ones of the plurality of subscriber devices over the shared transmission medium, to group highly-interfering subscriber devices into respective interfering groups based on the so-characterized interference, and to assign disjoint transmission time intervals to upstream communication from any one subscriber device of any one interfering group and to downstream communication towards any other subscriber device of the same interfering group.

The resource controller can form part of a wireline or wireless access node, such as a Fiber Coaxial Unit (FCU), a radio base station, a Radio Network Controller (RNC), a Mobility Management Entity (MME) and the likes, or may form part of a network manager or a network analyzer, or may be configured to run on one or more generic computing platforms (aka the cloud).

In one embodiment of the invention, first frequency resources initially assigned to downstream communication towards a first subscriber device of a first interfering group is re-assigned to downstream communication towards another second subscriber device of the first interfering group during a transmission time interval involving active upstream communication from the second subscriber device; and second frequency resources initially assigned to downstream communication towards the second subscriber device is re-assigned to downstream communication towards the first subscriber device during a further transmission time interval involving active upstream communication from the first subscriber device.

In one embodiment of the invention, first frequency resources initially assigned to downstream communication towards a first subscriber device of a first interfering group is re-assigned to downstream communication towards another third subscriber device of another second interfering group during a transmission time interval involving active upstream communications from another second subscriber device of the first interfering group and from the third subscriber device; and third frequency resources initially assigned to downstream communication towards the third subscriber device is re-assigned to downstream communication towards the first subscriber device during a further transmission time interval involving active upstream communications from the first subscriber device and from another fourth subscriber device of the second interfering group.

In one embodiment of the invention, interference characterization comprises characterizing path losses of respective coupling paths between respective ones of the plurality of subscriber devices.

In one embodiment of the invention, interference characterization comprises characterizing transmit and/or receive power levels at respective ones of the plurality of subscriber devices.

In one embodiment of the invention, interference characterization comprises carrying out interference measurements over the shared transmission medium between respective ones of the plurality of subscriber devices.

The interference measurements can be carried out off-line or on-line, e.g. by means of mutually orthogonal pilot sequences that modulate respective pilot signals transmitted by the respective subscriber devices.

In one embodiment of the invention, grouping comprises comparing individual or aggregate interference levels incurred by respective ones of the plurality of subscriber devices from other subscriber devices with respect to respective sustainable interference thresholds.

In one embodiment of the invention, downstream and upstream communications with the plurality of subscriber devices are full-duplex communications defined over a common set of frequency resources.

The terminals are first organized into different interfering groups depending on the respective coupling losses between each other. For instance, all terminals connected to the taps of one single splitter in a cable plant can make up a group. Within each of these interfering groups, upstream transmission of one subscriber device and downstream transmission of another subscriber device cannot occur simultaneously and shall use disjoint transmission time intervals. Depending on the instantaneous traffic condition or Quality of service (Qos) requirements, the access node allocates frequency and time resources to each terminal such that the above constraint is adhered to. In this way, harmful inter-terminal interference is avoided while retaining the full capacity of full-duplex transmission.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION OF THE INVENTION

Figure 1:
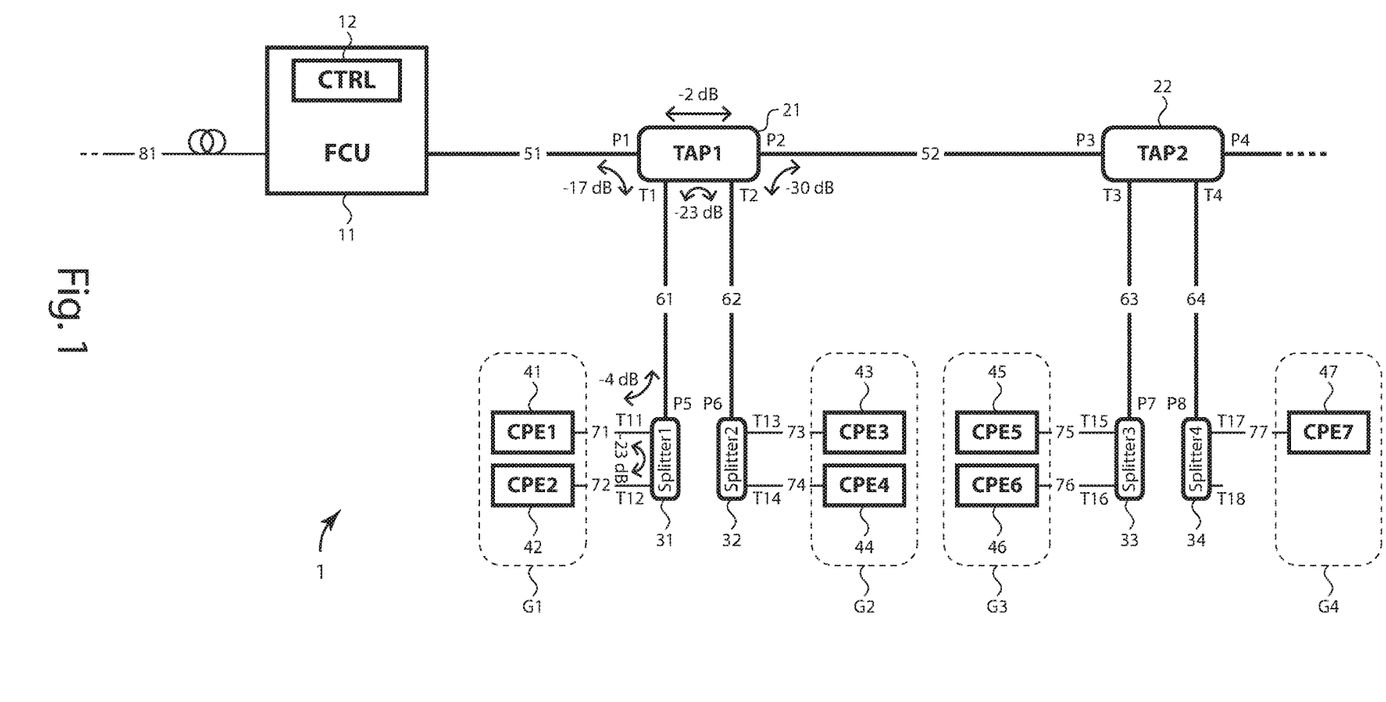
FIG. 1 represents a particular embodiment of a coaxial plant.

There is seen in FIG. 1 part of a Hybrid Fiber Coax (HFC) communication system 1 comprising an FCU 11 coupled to Customer Premises Equipment (CPE) 41 to 47 via a cable plant, and to an operator's network (not shown) via one or more optical links 81.

The cable plant comprises primary coaxial segments 51 and 52, secondary coaxial segments 61 to 64, and ternary coaxial segments 71 to 77. The primary coaxial segment 51 couples the FCU 11 to the input port P1 of a first two-way tap 21 (or TAP1), and the primary coaxial segment 52 couples the output port P2 of the tap 21 to the input port P3 of another second two-way tap 22 (or TAP2). The taps 21 and 22 further comprise tap ports T1 to T4 for connection to CPEs or further splitters. Presently, the tap port T1 of the tap 21 is coupled via a secondary coaxial segment 61 to the input port P5 of a splitter 31, the tap ports T11 and T12 of which are coupled via ternary coaxial segments 71 and 72 to the CPEs 41 and 42 (or CPE1 and CPE2); the tap port T2 of the tap 21 is coupled via a secondary coaxial segment 62 to the input port P6 of a splitter 32, the tap ports T13 and T14 of which are coupled via ternary coaxial segments 73 and 74 to the CPEs 43 and 44 (or CPE3 and CPE4); the tap port T3 of the tap 22 is coupled via a secondary coaxial segment 63 to the input port P7 of a splitter 33, the tap ports T15 and T16 of which are coupled via ternary coaxial segments 75 and 76 to the CPEs 45 and 46 (or CPE5 and CPE6); and last, the tap port T4 of the tap 22 is coupled via a secondary coaxial segment 64 to the input port P8 of a splitter 34, the tap port T17 of which is coupled via a ternary coaxial segment 77 to the CPE 47 (or CPE7), while the tap port T18 is left open (typically with a matching impedance).

The cable plant may comprise further taps, splitters and CPEs, possibly inter-connected in a different way. The particular topology plotted in FIG. 1 is only one out of many, and only serves as an illustrative example for the forthcoming description.

The coupling losses induced by the taps 21 and 22 and the splitters 31 to 34 depend on their exact hardware architecture and implementation, and may vary from one coupler type to another, and further from one manufacturer to another. Yet, there are some generic coupling characteristics that are noteworthy.

The path loss of the bi-directional coupling path between the input port P1 and the output port P2 of the tap 21, respectively the input port P3 and the output port P4 of the tap 22, typically ranges from 1 to 3 dB. Let this path loss be 2 dB hereinafter. The path loss between the primary ports P1 and the respective tap ports T1 or T2, respectively between the primary port P3 and the respective tap ports T3 or T4, is higher, generally ranging from 8 to 27 dB depending on the distance to FCU 11. Let this path loss be 17 dB hereinafter. The path losses between the input port and the respective tap ports of the splitters 31 to 34 is typically about 4 dB for a two-way splitter. Let this path losses be 4 dB hereinafter. The taps 21 and 22 prevent the return upstream signal received at their output port from coupling back into the tap ports. This path loss is typically about 30 dB, and we will assume this value hereinafter. Finally, the tap ports of the taps 21 and 22 and of the splitters 31 to 34 are isolated from each other by a path loss in the range of 20 to 25 dB, and we will assume a common value of 23 dB hereinafter. The respective path losses and corresponding assumed values have been plotted in FIG. 1.

The FCU 11 comprises a transceiver, and so does the CPEs 41 to 47 (not shown). A transceiver typically includes a Digital Signal Processor (DSP) and an Analog Front End (AFE).

The AFE comprises a Digital-to-Analog Converter (DAC) and an Analog-to-Digital Converter (ADC), a transmit filter and a receive filter for confining the signal energy within the appropriate communication frequency bands while rejecting out-of-band interference, a line driver for amplifying the transmit signal and for driving the transmission medium, and a Low Noise Amplifier (LNA) for amplifying the receive signal with as little noise as possible.

The AFE further comprises a hybrid for coupling the transmitter output to the transmission medium and the transmission medium to the receiver input while achieving low transmitter-receiver coupling ratio. The AFE or the DSP further accommodates an echo cancellation filter to reduce the echo signal at a further extent.

The AFE further comprises impedance-matching circuitry for adapting to the characteristic impedance of the transmission medium, and some surge protection and isolation circuitry.

The DSP is configured to operate downstream and upstream communication channels for conveying user traffic over the coaxial medium.

The DSP is further configured to operate downstream and upstream control channels that are used to transport control traffic, such as diagnosis or management commands and responses. Control traffic is multiplexed with user traffic over the transmission medium, More specifically, the DSP is for encoding and modulating user and control data into digital data symbols, and for demodulating and decoding user and control data from digital data symbols.

The following transmit steps are typically performed within the DSP:

data encoding, such as data multiplexing, framing, scrambling, error correction encoding and interleaving;
signal modulation, comprising the steps of ordering the carriers according to a carrier ordering table, parsing the encoded bit stream according to the bit loadings of the ordered carriers, and mapping each chunk of bits onto an appropriate transmit constellation point (with respective carrier amplitude and phase), possibly with Trellis coding;
signal scaling;
Inverse Fast Fourier Transform (IFFT);
cyclic Prefix (CP) insertion; and possibly
time-windowing.

The following receive steps are typically performed within the DSP:

CP removal, and possibly time-windowing;
Fast Fourier Transform (FFT);
Frequency EQualization (FEQ);
signal demodulation and detection, comprising the steps of applying to each and every equalized frequency sample an appropriate constellation grid, the pattern of which depends on the respective carrier bit loading, detecting the expected transmit constellation point and the corresponding transmit binary sequence encoded therewith, possibly with Trellis decoding, and reordering all the detected chunks of bits according to the carrier ordering table; and
data decoding, such as data deinterleaving, error correction, de-scrambling, frame delineation and demultiplexing.

Some of these transmit or receive steps can be omitted, or some additional steps can be present, depending on the exact digital communication technology being used.

Communication over the coaxial plant is full-duplex and is defined over a common set of orthogonal carriers, meaning the same set of carriers is used for both downstream (from the FCU towards the CPEs) and upstream (from the CPEs towards the FCU) communications. Thus, the aggregate capacity is doubled when compared to legacy techniques such as FDD deployed for DOCSIS or xDSL technologies, or Time Division Duplexing (TDD) as envisioned for future G.Fast deployments. Yet, full-duplexing does not imply that the carriers used by each and every users are all the same: each user shall further be assigned non-overlapping frequency bands within the common frequency band.

In order to dynamically fit the actual traffic patterns of the respective users, the transmission resources are divided time-wise and frequency-wise. A particular frequency block (typically comprising a given number of carriers) within a particular time slot is referred to as a Transmission Resource Block (TRB).

The FCU 11 further comprises a resource controller 12 (or CTRL) that assigns the available TRBs based on the traffic demands of the respective users, as well as on their respective grade of service and on further scheduling criteria. A TRB is assigned to a particular direction of communication for a particular user. On account of full-duplex transmission, the same TRB can be assigned to the opposite direction of communication for the same or another user.

More formally, let us denote $D_{ti}$ the set of carriers used for downstream communication with user i during time interval t; and $U_{ti}$ the set of carriers used for upstream communication with user i during time interval t. The above constraints are formally expressed as:

$$D_{ti} \cap D_{tj} = \emptyset \forall t, \forall \{i,j\} \quad (1), \text{ and}$$

$$U_{ti} \cap U_{tj} = \emptyset \forall t, \forall \{i,j\} \quad (2).$$

With full-duplex transmission, one would expect all CPEs always receiving and transmitting over their respective frequency bands. Yet, because of the aforementioned issue with upstream-to-downstream interference, some clever time division scheme is required that substantially mitigates these interference while preserving the performance of full-duplex operation.

To this purpose, the resource controller 12 is configure to characterize the level of interference between respective ones of the CPEs 41 to 47 in order to isolate the strongly-interfering terminals within so-called interfering groups, and to impose some transmission constraints within each interfering group as will be set forth further in the description.

As a first embodiment, the resource controller 12 fetches characteristics of the cable plant and of data communications over the cable plant from a local repository (e.g., from a Management Information Base or MIB) and/or by communication with the respective transceivers. These characteristics are then used to compute upstream-to-downstream interference between the respective CPEs 41 to 47.

The resources controller 12 fetches the network topology, namely which piece of equipment is connected to which other piece of equipment, as well as the coupling characteristics of the coupling units, namely the coupling losses between the respective ports of the taps 21 and 22 and of the splitters 31 to 34 as aforementioned. Then, ignoring the insertion losses of the coaxial segments, the resource controller 12 computes approximate values for the path losses between the respective CPEs.

The path losses are expected to be symmetric, meaning that the path loss from a given CPE towards another CPE and the reverse path loss from that other CPE towards the given CPE are assumed to be approximately equal.

For instance, the path loss between the CPEs 41 and 42 is approximately equal to −23 dB; the path loss between the CPEs 41 and 43 (or 44) is approximately equal −4−23−4=−31. dB; and the path loss between the CPEs 41 and 45 (or 46 or 47) is approximately equal to −4−30−17−4=−55 dB.

Hence, and with knowledge of the transmit powers used for upstream communication by the respective CPEs, the resource controller 12 computes an estimate of the incurred interference power level $I_i$ at a given CPE CPEi assuming all other CPEs CPEj are concurrently transmitting upstream. The interference power level $I_i$ is computed as being the sum of the respective upstream transmit powers of these other CPEs CPEj weighted by the respective path losses between these other CPEs CPEj and the given CPE CPEi:

$$I_i = \sum_{j \neq i} |H_{ij}|^2 P_j^u, \quad (3)$$

wherein $H_{ij}$ denotes the transfer or coupling function from the CPE CPEj to the CPE CPEi, and $P_j^U$ denotes the upstream transmit power at the CPE CPEj. The frequency-dependence has been voluntarily omitted here in order to reduce the path losses and corresponding interference levels to simple scalar factors.

The resource controller 12 can get some more hindsight about the impairments induced in the AFE of CPE CPEi on account of simultaneous upstream transmission from the other CPEs CPEj by comparing the so-computed overall interference levels Ii with the receive power $P_j^D$ at the input of the CPE CPEi consisting of the direct downstream receive signal from the FCU 11 and the echo of CPEi's own upstream transmission:

$$P_i^D = |H_{i0}|^2 P_0^D + |H_{ii}|^2 P_i^U \qquad (4),$$

wherein $H_{i0}$ denotes the coupling function from the FCU 11 to the CPE CPEi, $H_{ii}$ denotes the echo coupling function within the CPE CPEi, $P_o^D$ denotes the downstream transmit power at the FCU 11, and $P_i^D$ denotes the downstream receive power at the CPE CPEi.

The parameters $H_{i0}$ and $H_{ii}$ can be measured by the CPE CPEi, reported back to the FCU 11, and used in combination with known $P_o^D$ and $P_i^u$ to yield $P_i^D$. Alternatively the receive power $P_i^D$ can be measured by the CPE CPEi while other CPEs are silent, and reported back to the FCU 11.

We can expect, without those interference Ii, the input signal to be scaled by some factor a by an Automatic Gain Amplifier (AGC) to match some reference voltage $V_{ref}$ at the ADC's input, or alternatively:

$$\alpha^2 P_i^D = V_{ref}^2 = P_{ref} \qquad (5).$$

The voltage reference $V_{ref}$ is determined based on the nominal input voltage range supported by the ADC, taking due account of the expected Peak-to-Average Ratio (PAR) of the input signal.

Accounting now for the incurred upstream-to-downstream interference Ii from the other CPEs CPEj, and assuming the input signal is still scaled by some factors h to match the reference voltage $V_{ref}$, we have:

$$\beta^2 (P_i^D + I_i) = \beta^2 \left( |H_{i0}|^2 P_0^D + \sum_j |H_{ij}|^2 P_j^u \right) = P_{ref} = a^2 P_i^D,$$

meaning that the gain reduction b/a of the direct signal assuming all other CPEs CPEj are transmitting is given by:

$$(\beta/a)^2 = \frac{P_i^D}{(P_i^D + I_i)} = \frac{|H_{i0}|^2 P_0^D}{\left( |H_{i0}|^2 P_0^D + \sum_j |H_{ij}|^2 P_j^u \right)} < 1. \qquad (6)$$

If the noise floor is mostly determined by the quantization noise of the ADC (which is generally the case), then eq. (6) gives the expected SNR reduction at CPEi. To mitigate this impairment, the resource controller 12 organizes the CPEs into interfering groups.

As a possible implementation, the algorithm would run as follows. A given CPEi is selected as the victim. The other CPEs CPEj are sorted according to their respective interference level $|H_{ij}|^2 P_j^u$ with the victim CPE CPEi, starting from the weakest interferer up to the strongest interferer. The contribution of the weakest interferer is added first to eq. (6) alone, yielding a first gain reduction value. The process is re-iterated adding the next interferer in the sorted list together with the weakest one, and so forth till the computed gain reduction is beyond a given threshold. This last CPE, which has caused a violation of the threshold, as well as the other CPEs whose contribution has not been taken into account so far, and which would also have caused a similar violation as their contribution is even higher, are assigned to the same interfering group as the CPE CPEi. As a further optional step, one may start again with another CPE of that group as the victim CPE and check whether the group content remains unchanged, or if new CPEs need to be added to the group. The algorithm carries on with another CPE not assigned to any interfering group so far as the next victim CPE, and till all CPEs have been properly organized into interfering groups.

It is to be noticed that an interfering group may comprise one single CPE only if the total interference incurred from all the other CPEs does not exceed the configured threshold.

Alternatively, and without accounting for the direct receive signal power, one may roughly computes the individual coupling losses between a given victim CPE and the other CPEs, and select out the CPE(s) whose individual coupling loss towards the victim CPE is lower than a pre-determined threshold as being within the same interfering group as the victim CPE. This algorithm is simpler but less accurate.

As an illustrative example, the CPEs 41 and 42 are grouped into interfering group G1 as they do experience from each other a −23 dB path loss that can be damageable for their downstream communication. The CPEs 43 and 44 are probably a marginal case at −31 dB, and could or could not be added to the same interfering group G1. For the purpose of illustration, this path loss is assumed to be high enough and they are added to a different interfering group G2. The CPEs 45 and 46 are not expected to substantially impair downstream communications of CPE 41 to 44 as their path loss is at −55 dB. The CPEs 45 and 46 are thus grouped into a third interfering group G3. The CPE 47 is left alone within the interfering group G4 as the interference incurred from all the other CPEs is deemed to be acceptable. The corresponding interfering groups G1 to G4 have been plotted in FIG. 1.

Still alternatively, the resource controller 12 can organize the CPEs into interfering groups based on interference measurements carried out over the cable plant. The interference measurements can be performed on-line, off-line, or during a specific initialization or diagnosis phase.

For instance, the CPEs 41 to 47 and the FCU 11 are assigned mutually orthogonal pilot sequences, such as derived from e.g. Wish-Hadamard sequences, for modulation of pilot symbols. The pilot carriers of the pilot symbols are 4-QAM modulated by the successive pilot digits from the respective pilot sequences, and transmit one of two complex constellation points, either '1+j' corresponding to '+1', or '−1−j' corresponding to '−1'.

The pilot symbols are synchronously transmitted by all the transceivers connected to the cable plant during reserved symbol positions. In order to characterize the interference over the whole frequency range, the pilot carriers are representative carriers of the common set of carriers, no matter which carriers are used for actual data communication with the respective CPEs.

During the transmission of the pilot symbols, the transceivers also measure the slicer errors of the received pilot symbols. The slicer error is measured for each and every pilot carrier of each of every pilot symbol, and comprises both the real and imaginary part of the difference vector between the received and properly equalized frequency sample and the constellation point onto which this frequency sample is demapped, or between the received frequency sample and a known constellation point that has been used for transmission. The successively measured slicer errors are then reported back to the resource controller 12. Some frequency decimation can be used for reducing the size of the error reports.

The power of the pilot signals can also be gradually increased so as to avoid any signal clipping in the AFEs of the CPEs and corresponding estimation biases.

The successive error samples as measured by a given victim CPE CPEi are next correlated with the corresponding pilot sequence used by a given interfering CPE CPEj in order to obtain (after some power normalization) the contribution from that particular CPE CPEj. As the pilot sequences are mutually orthogonal, the contributions from the other interfering CPEs reduce to zero after this correlation step.

Hence, the resource controller 12 can get an exact knowledge of the magnitude vs frequency of the coupling functions between the FCU 11 and the respective CPEs 41 to 47, as well as between the respective CPEs 41 to 47. This information is then used to properly organize the CPEs into interfering groups. This solution is further advantageous as no topological data need to be maintained.

One may alternatively use pilot signals that are sequentially transmitted by the respective CPEs 41 to 47 one by one. One could use for instance a Pseudo Random Binary Sequence (PRBS) for modulating the pilot signals. The PRBS can be re-generated at the receive side so as to determine the exact transmit frequency sample and thus the corresponding error vector.

Once the interfering groups have been properly defined, the resource controller 12 imposes some transmission constraints within each interfering group: upstream transmission from any CPE of a given interfering group is configured such that it does not collide with downstream transmission towards any other CPE of the same interfering group: upstream transmission from any CPE of a given interfering group may however take place concomitantly with downstream transmission towards that same CPE. More formally, this mathematically translates into the following allocation constraints:

$$\forall\{t,k\}, \exists i \in G_k, U_{ti} \neq \emptyset \rightarrow \forall j \neq i \in G_k: D_{tj} = \emptyset \quad (7), \text{ or}$$

$$\forall\{t,k\}, \exists i \in G_k: D_{ti} \neq \emptyset \rightarrow \forall j \neq i \in G_k: U_{tj} = \emptyset \quad (8),$$

where again $D_{ti}$, respectively $U_{ti}$, denotes the set of carriers used for downstream, respectively upstream, communication with user i during time interval t, and wherein the $\{Gk\}_{k=1 \ldots K}$ denotes the set of interfering groups.

Figure 2A:
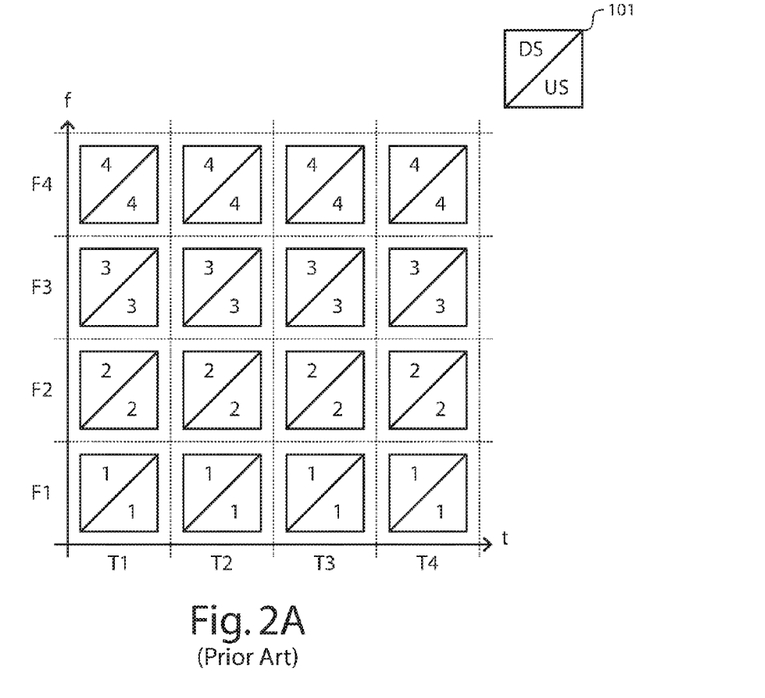
FIG. 2A represents a resource allocation scheme as per the prior art.

There is seen in FIG. 2A a first allocation scheme that is typically used for full-duplex transmission. To ease the illustration, only CPEs 41 to 44, and the corresponding interfering groups G1={41, 42} and G2={43, 44}, have been considered. The horizontal time axis is divided into time intervals T1, T2, T3, T4, and so forth; and the vertical frequency axis is divided into frequency blocks F1, F2, F3, F4, and so forth. A TRB is then defined as a combination of a particular frequency block and a particular time interval, and is plotted as a square 101 in FIG. 2A. As the same TRB can be assigned to both upstream and downstream communications, the TRB square is diagonally divided: the upper-left part refers to downstream communication (DS), while the bottom-right part refers to upstream communication (US). For each TRB, the user that is assigned that TRB for downstream communication is mentioned in the top-left corner, while the user that is assigned that TRB for upstream communication is mentioned in the bottom-right corner. Users are identified by indexes ranging from 1 to 4 for CPEs 41 to 44 respectively.

With full-duplex transmission, each user is typically assigned a dedicated frequency band for both upstream and downstream communications. Namely, the users 1 to 4 use the frequency blocks F1 to F4 respectively during all time intervals. Yet, as aforementioned, such a trivial allocation scheme would cause a substantial increase of the quantization noise at the respective CPEs. To alleviate this issue, a more clever allocation scheme needs to be designed that conforms to constraints (7) and (8) during any transmission time interval.

Figure 2B:
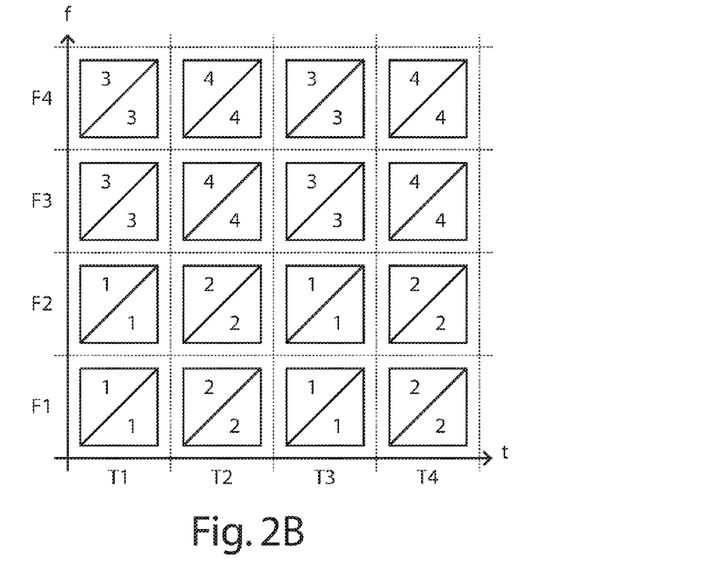
FIGS. 2B, 2C and 2D represent three resource allocation schemes as per the present invention.

There is seen in FIG. 2B a first exemplary allocation scheme as per the present invention. During time interval Ti, user 1 (or CPE 41) is assigned frequency blocks F1 and F2 for both downstream and upstream communications. During that same time interval, user 2 (or CPE 42), which belongs to the same interfering group as user 1, remains silent, thereby conforming to constraints (7) and (8). Similarly, during time interval T1, user 3 (or CPE 43) is assigned frequency blocks F3 and F4 for both downstream and upstream communications; and again user 4 (or CPE 44), which belongs to the same interfering group as user 3, remains silent.

During time interval T2, the scheme is reversed for allowing user 2, respectively user 4, to communicate: now user 1, respectively user 3, remains silent to conform to constraints (7) and (8).

As one can see, this allocation scheme achieves the performances expected for full-duplex transmission as each user is still assigned 4 TRBs in each direction of communication, while avoiding strong interference from neighboring terminals.

One may of course account for the actual amount of traffic to be transmitted to/from the respective user's: if user 2 has nothing to send nor to receive during time interval T2, then the frequency blocks F1 and F2 can remain assigned to user 1 as during time interval T1. One may further account for possible latency constraints related to the time division aspect of the assignment, as well as for the respective grades of service which may limit the maximum amount of downstream and/or upstream TRBs assigned to a given user.

Figure 2C:
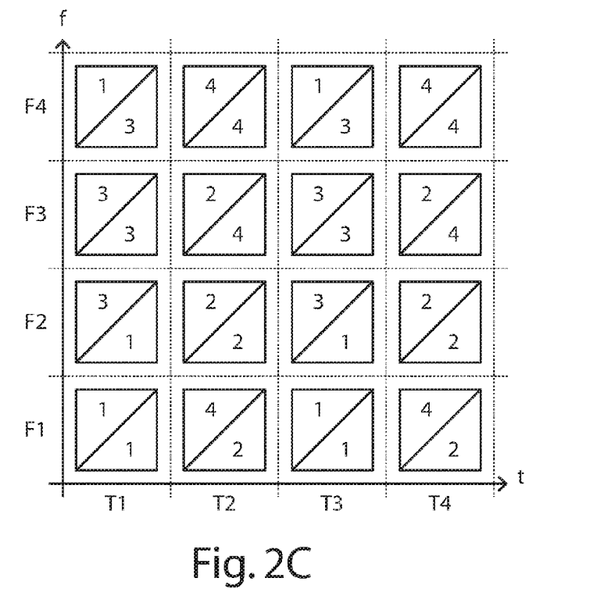

There is seen in FIG. 2C a second allocation scheme as per the present invention. During time interval T1, user 1 is now assigned frequency block F1 for downstream communication, and frequency blocks F1 and F2 for upstream communication. As the frequency block F2 cannot be used by the user 2 for downstream communication as user 1 is transmitting upstream, it is re-assigned to user 3, which belongs to another interfering group. Similarly, the frequency blocks F3 and F4 are assigned to user 3 for upstream communication, while the frequency block F3 is assigned to user 3 for downstream communication. Again, the frequency block F4, which cannot be used by user 4 on account of constraints (7) and (8), is re-assigned to user 1.

During time interval T2, user 2 is now allowed to transmit upstream on both frequency blocks F1 and F2, and downstream on frequency block F2. Downstream frequency block F1, initially assigned to user 1, is re-assigned to user 4, which belongs to another interfering group. Similarly, the upstream frequency blocks F3 and F4 and the downstream frequency block F4 are assigned to user 4, while the downstream frequency block F3 is re-assigned to user 2.

Again, this allocation scheme achieves the performances expected for full-duplex transmission as each user is still assigned 4 TRBs in each direction of communication, while still avoiding strong interference from neighboring terminals.

Figure 2D:
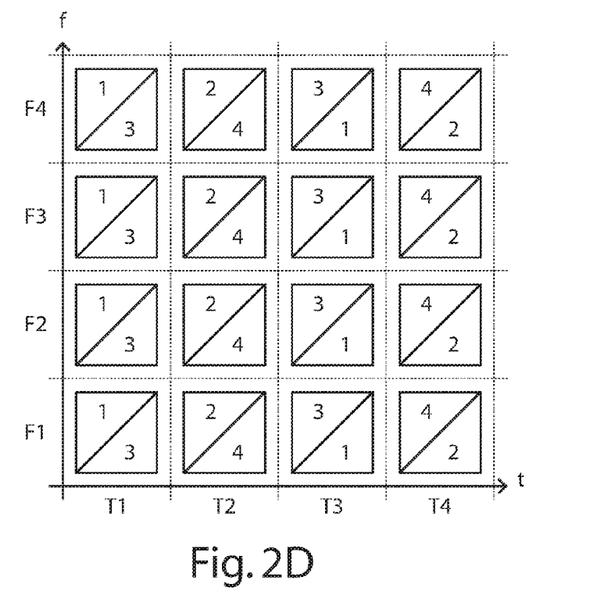

There is seen in FIG. 2D a third alternative allocation scheme as per the present invention. During time interval T1, user 1 is assigned frequency blocks F1 to F4 for downstream communication, and user 3 is assigned frequency blocks F1 to F4 for upstream communication. During time interval T2, user 2 is assigned frequency blocks F1 to F4 for downstream communication, and user 4 is assigned frequency blocks F1 to F4 for upstream communication. During time interval T3, user 3 is assigned frequency blocks F1 to F4 for downstream communication, and user is assigned frequency blocks F1 to F4 for upstream communication. And last, during time interval 14, user 4 is assigned frequency blocks F1 to F4 for downstream communication; and user 2 is assigned frequency blocks F1 to F4 for upstream communication. Again, constraints (7) and (8) are adhered to during any of these time intervals, and again each user is still assigned 4 TRBs in each direction of communication.

It is to be noticed that, if an interfering group comprises one device only (like the interfering group G4), then trivially no transmission constraints are imposed on that device. Also, there might be an additional frequency band dedicated to communication control and management. Only very few carriers from this band need to be assigned, and thus we can expect the level of induced interference to remain rather low. Thereby we may use another allocation paradigm for these control carriers (i.e., carriers used for conveying control traffic) than we do for the data carriers (i.e., carriers used for conveying user payload traffic).

It is to be further noticed that, although the detailed description focuses on coaxial communications, the present invention is equally applicable to wireless communications, although the grouping of the user terminals into interfering groups is expected to be more complex on account of the user mobility and dynamics.

It is to be further noticed that the term 'comprising' should not be interpreted as being restricted to the means listed thereafter. Thus, the scope of the expression 'a device comprising means A and B' should not be limited to devices consisting only of components A and B. It means that with respect to the present invention, the relevant components of the device are A and B.

It is to be further noticed that the term 'coupled' should not be interpreted as being restricted to direct connections only. Thus, the scope of the expression 'a device A coupled to a device B' should not be limited to devices or systems wherein an output of device A is directly connected to an input of device B, and/or vice-versa. It means that there exists a path between an output of A and an input of B, and/or vice-versa, which may be a path including other devices or means.

The description and drawings merely illustrate the principles of the invention. It will thus be appreciated that those skilled in the art will be able to devise various arrangements that, although not explicitly described or shown herein, embody the principles of the invention. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, a processor should not be construed to refer exclusively to hardware capable of executing software, and may implicitly include, without limitation, digital signal processor (DSP) hardware, network processor, application specific integrated circuit (ASIC), field programmable gate array (FPGA), etc. other hardware, conventional and/or custom, such as read only memory (ROM), random access memory (RAM), and non volatile storage, may also be included.

The invention claimed is:

1. A method for assigning transmission resources to communications between an access node and a plurality of subscriber devices coupled to a shared transmission medium, and comprising:
    characterizing interference between respective ones of the plurality of subscriber devices over the shared transmission medium;
    grouping highly-interfering subscriber devices into respective interfering groups based on the so-characterized interference; and
    assigning a first transmission time interval to upstream communication from a first subscriber device among the plurality of subscriber devices and a second transmission time interval to downstream communication towards a second subscriber device among the plurality of subscriber devices, the first transmission time interval and the second transmission time interval being mutually disjoint, the first subscriber device and the second subscriber device being grouped in a first interfering group among the interfering groups.

2. A method according to claim 1, wherein first frequency resources initially assigned to downstream communication towards a first subscriber device of a first interfering group are re-assigned to downstream communication towards another second subscriber device of the first interfering group during a transmission time interval involving active upstream communication from the second subscriber device, and
    wherein second frequency resources initially assigned to downstream communication towards the second subscriber device is re-assigned to downstream communication towards the first subscriber device during a further transmission time interval involving active upstream communication from the first subscriber device.

3. A method according to claim 1, wherein first frequency resources initially assigned to downstream communication towards a first subscriber device of a first interfering group is re-assigned to downstream communication towards another third subscriber device of another second interfering group (G2) during a transmission time interval involving active upstream communications from another second subscriber device of the first interfering group and from the third subscriber device,
    and wherein third frequency resources initially assigned to downstream communication towards the third subscriber device is re-assigned to downstream communication towards the first subscriber device during a further transmission time interval involving active upstream communications from the first subscriber device and from another fourth subscriber device of the second interfering group.

4. A method according to claim 1, wherein interference characterization comprises characterizing path losses of respective coupling paths between respective ones of the plurality of subscriber devices.

5. A method according to claim 4, wherein interference characterization comprises characterizing transmit and/or receive power levels at respective ones of the plurality of subscriber devices.

6. A method according to claim 1, wherein interference characterization comprises carrying out interference measurements over the shared transmission medium between respective ones of the plurality of subscriber devices.

7. A method according to claim 6, wherein the interference measurements are carried out by mutually orthogonal pilot sequences that modulate respective pilot signals transmitted by respective ones of the plurality of subscriber devices.

8. A method according to claim 1, wherein grouping comprises comparing individual or aggregate interference levels incurred by respective ones of the plurality of subscriber devices from other subscriber devices with respect to respective sustainable interference thresholds.

9. A method according to claim 1, wherein downstream and upstream communications with the plurality of subscriber devices are full-duplex communications defined over a common set of frequency resources.

10. An access node comprising:
a resource controller for assigning transmission resources to communications between an access node and a plurality of subscriber devices coupled to a shared transmission medium, and configured to
characterize interference between respective ones of the plurality of subscriber devices over the shared transmission medium,
group highly-interfering subscriber devices into respective interfering groups based on the so- characterized interference, and
assign a first transmission time interval to upstream communication from a first subscriber device among the plurality of subscriber devices and a second transmission timer interval to downstream communication towards a second subscriber device among the plurality of subscriber devices, the first transmission time interval and the second transmission time interval being mutually disjoint, the first subscriber device and the second subscriber device being grouped in a first interfering group among the interfering groups.

* * * * *